United States Patent
Hus et al.

(10) Patent No.: US 8,180,380 B2
(45) Date of Patent: May 15, 2012

(54) ASSOCIATED PAGING INDICATOR

(75) Inventors: Olivier Jean-Michel Hus, Redhill (GB);
Matthew Peter John Baker, Canterbury (GB); Timothy James Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 971 days.

(21) Appl. No.: 12/092,284

(22) PCT Filed: Oct. 26, 2006

(86) PCT No.: PCT/IB2006/053943
§ 371 (c)(1),
(2), (4) Date: May 1, 2008

(87) PCT Pub. No.: WO2007/052190
PCT Pub. Date: May 10, 2007

(65) Prior Publication Data
US 2008/0293439 A1    Nov. 27, 2008

(30) Foreign Application Priority Data

Nov. 1, 2005 (EP) ................................... 05110229
Jan. 3, 2006 (EP) ................................... 06100034

(51) Int. Cl.
*H04W 68/00*    (2009.01)

(52) U.S. Cl. ........................................................ 455/458

(58) Field of Classification Search ................. 455/558, 455/67.11, 426.1; 370/335, 313, 329, 310, 370/338
See application file for complete search history.

(56) References Cited

U.S. PATENT DOCUMENTS

| | | | |
|---|---|---|---|
| 2004/0165563 A1* | 8/2004 | Hsu et al. | 370/338 |
| 2004/0229605 A1 | 11/2004 | Hwang et al. | |
| 2005/0101351 A1* | 5/2005 | Lee et al. | 455/558 |
| 2006/0104225 A1* | 5/2006 | Kim et al. | 370/313 |
| 2007/0076643 A1* | 4/2007 | Yang et al. | 370/310 |

FOREIGN PATENT DOCUMENTS

| | | |
|---|---|---|
| EP | 1420551 A2 | 5/2004 |
| WO | WO2005006829 A2 | 1/2005 |

OTHER PUBLICATIONS

ETSI: TS 125 331 Universal Mobile Telecommunications System (UMTS); RRC Protocol Specification (3G TS 25.331 Version 3.1.0 Release 1999), Jan. 2000, Whole Document, 284 Pages.

* cited by examiner

*Primary Examiner* — Melody Mehrpour

(57) ABSTRACT

A receiver for receiving wireless communication signals from a transmitter is arranged to operate in one of a plurality of states. The receiver is arranged to perform a state transition from the current state to another state among the plurality of states upon reception of a Paging Indicator Signal. The Paging Indicator Signal comprising an indication of the one of the plurality of states to which the state transition is to be performed.

18 Claims, 1 Drawing Sheet

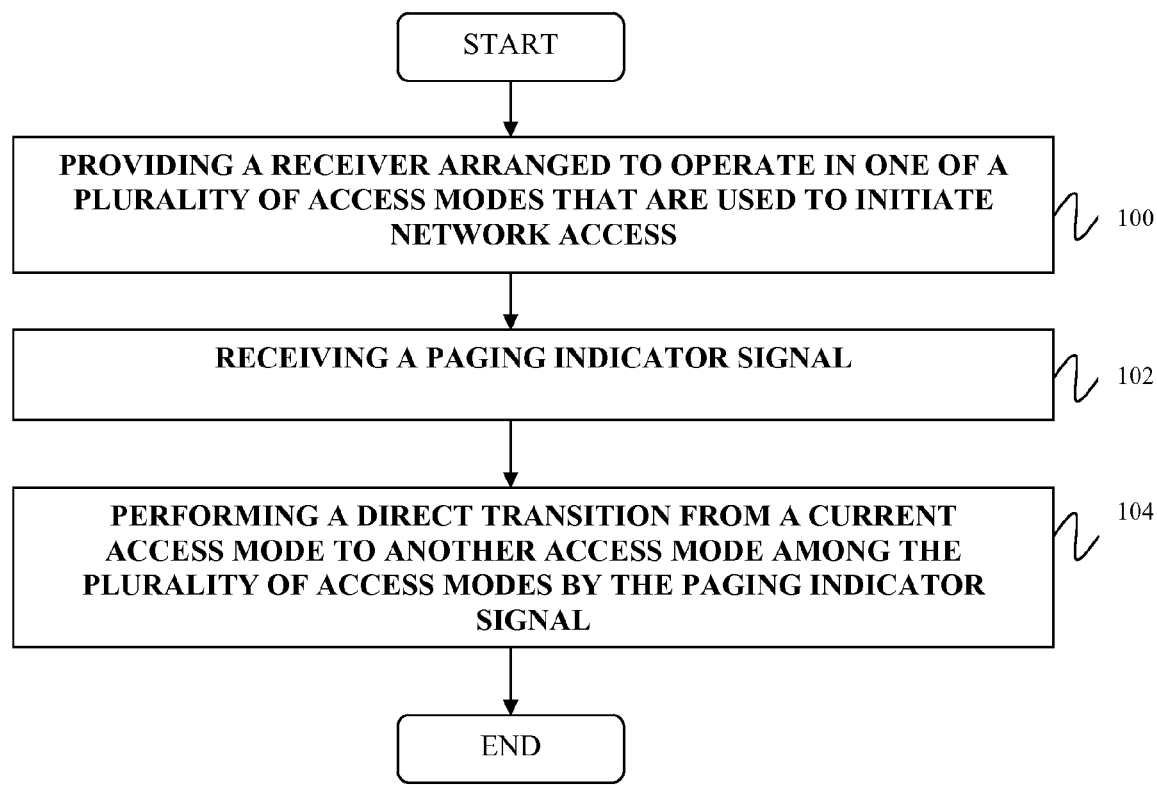

ASSOCIATED PAGING INDICATOR

The invention relates to a receiver for receiving a wireless communication signal and a transmitter for transmitting a wireless communication signal. The invention further relates to a mobile terminal comprising such receiver and a base station comprising such transmitter. Finally, the invention relates to a communication system comprising such mobile terminal and base station and to a Paging indicator signal for use with the receiver.

The field of the invention is telecommunication systems such as WCDMA/UMTS telecommunication systems which encompasses both data and voice telecommunication services and particularly to telecommunications systems requiring a selection of frequencies for reception of data services. The invention is suitable for application in mobile terminals such as a mobile phone or a Personal Digital Assistant or a mobile personal computer having a wireless connection and the like.

Mobile terminals generally can be operative in different access modes states depending type of access required. In current prior art systems, state changes are initiated by going through various paging and/or signaling protocols. It will be apparent to the skilled person in the art of telecommunications that this adds latency to the system, which is undesirable particularly when a frequent change in access mode is desired.

It is therefore an object of the invention to provide for a receiver that reduces the latency of the telecommunication system. This object is according to the invention realized in that the receiver is arranged to operate in one of a plurality of access modes that are used to initiate network access, wherein the receiver upon reception of a Paging Indicator Signal is arranged to perform a transition from a current access mode to another access mode among the plurality of possible access modes, the Paging Indicator Signal comprising an indication of the one of the plurality of possible access modes to which the transition is to be performed. According to the invention it is the paging indicator signal itself that instructs the receiver to perform the required access mode switch. According to another aspect of the invention, the transition is a direct transition. In this context direct means that the change in access mode is immediate after receipt of the Paging Indicator Signal and that no additional signaling is needed to carry out the state change. It will be apparent to the skilled person that by eliminating signaling during each state change less latency is introduced resulting in a faster set up. The paging signal indicator is an encoded indicator that is representative of associated characteristics of the access mode transitions, corresponding (transport) channels and other merged parameters. The paging Indicator Signal may assume different values, wherein a value is to be understood in the broadest possible sense and not limited to numerical values. The associated characteristics of a Paging Indicator Signal may, for example, encapsulate information on the access mode after the required transition and about the channels to be used during the network access and/or parameter values like RACH channel identities, priorities, number of RACH preamble attempts permitted and the rate of RACH preamble power ramping. The value that the Paging Indicator signal can assume can either be selected from a group of pre-configured characteristics or may be generated ad-hoc. Typically the Paging Indicator Signal would be sent on a Paging Channel. The pre-configured characteristics can e.g. take the form of a virtual matrix the entries of which can be represented by the "value" of the Paging Indicator Signal. Such virtual matrix could be pre-configured in the system or could be generated at run time for example during a set-up phase between transmitter and receiver. Consequently, under the new invention, a receiving terminal would select and store a set of access parameters according to the particular value carried by the Paging Indicator Signal, the value being selected from among a set of values each indicating a different set of access parameters The available set of values indicating sets of access parameters, may be a subset of a larger set of values that are indicating actions to be performed in greater detail, for example some values of the total set may initiate state transitions (see below), while other values indicate particular sets of access parameters to be used in future uplink attempts.

By using the proposed scheme, considerable simplifications in the overall system architecture can be achieved. In a telecommunication system comprising more than one receiver, the Paging Indicator Signal may or may not be transmitted to/received by each of the receivers or may—upon reception—be interpreted differently in accordance with a pre-configured programming of the receiver.

Depending on whether a terminal is available for network-initiated calls, it may be able to ignore certain subsets of the available Paging Indicator Signals, for example, a terminal which is already active in an uplink transmission may in some circumstances be able to ignore the Paging Indicator Signal indicating a change to a different pre-configured uplink access parameter set.

In addition to being able to operate in different access modes, mobile terminals in general are also arranged to operate in different logical states depending on the required mode of operation. Examples of logical states in the UTRAN of WCDMA/UMTS are e.g. Idle Mode, CELL_DCH, CELL_PCH, URA_PCH as will be apparent to the person skilled in the art. In addition, the signals for setting up and maintaining a UTRAN connection between transmitters and receiver are transported on a multitude of transport channels such as the Paging channel PCH for transmitting Paging Indicators and the Forward Access Channel (CELL-FACH) for transmitting low-rate data. According to current practice, a receiver upon receiving a Paging Indicator in an Idle Mode state, may be told to wake-up and switch to a CELL_FACH state to start receiving a FACH transmission. When a receiver in Idle Mode is paged and told to switch state to CELL_FACH before receiving a FACH transmission, it has to go through various signaling protocols, which again introduces latency to the system. Therefore according to another aspect of the invention the receiver is further arranged to operate in one of a plurality of states, wherein the receiver upon reception of the Paging Indicator Signal is arranged to perform a state transition from a current state to another state among a plurality of states, the indication comprised in the Paging Indicator Signal being indicative of the one of the plurality of states to which the state transition is to be performed. Also in this case the Paging Signal Indicator is an encoded indicator that is representative of associated characteristics of state transitions, corresponding (transport) channels and other merged parameters. The paging Indicator Signal may again assume different values, wherein a value is to be understood in the broadest possible sense and not limited to numerical values. The associated characteristics of a Paging Indicator Signal may, for example, encapsulate information on the state after the required transition (which may be dependent on the state in which the receiver is when the paging indicator signal is received) and about channels to be received before and after. As such, the Paging Signal Indicator signal comprises an indication of to which state the receiver has to perform a state transition.

Likewise, the value that the Paging Indicator Signal can assume can either be selected from a group of pre-configured characteristics or may be generated ad-hoc. In case of pre-configured characteristics, the Paging Indicator Signal may for example select a value out of a virtual matrix that is formed by state transitions versus the channels. Consequently an entry in the virtual matrix would indicate a possible state transition and the channels that correspond to that state. The pre-configured virtual matrix could be pre-programmed in the system or could be generated at run-time for example during a set-up phase between transmitter and receiver. By using the proposed scheme, considerable simplifications in the overall system architecture can be achieved. In a telecommunication system comprising more than one receiver, the Paging Indicator Signal may or may not be transmitted to/received by each of the receivers or may—upon reception—be interpreted differently in accordance with a pre-configured programming of the receiver.

In case of a state change for example from Idle Mode to CELL-FACH, the Paging Indicator Signal can instruct the receiver to wake-up, to switch to a CELL-FACH state and to start receiving a FACH transmission. It will be apparent to the skilled person that the Paging Indicator Signal can also be used to enforce other receiver settings such a selection of frequency. In this case, the Paging Indicator Signal serves as a frequency reselection indicator that may be used in e.g. network-assisted frequency reselection such as for the Frequency Layer Convergence Scheme for MBMS (Multimedia Broadcast Multicast Service), which is well known in the art. The Paging Indicator Signal could be used to define the type of data reception such as broadcast, multicast or unicast reception. Alternatively, the state change could even enforce the receiver to operate in several virtual states at a time.

According to another aspect of the invention the receiver is further arranged to receive a data signal after the state transition, the data signal being of a type suited for the reception by the receiver during the second state to which the receiver has transitioned. This way the Paging Indicator Signal serves as a kind of a preamble carrying information of the service availability of the data signal e.g. a broadcast data signal, which is to be received next.

According to a further aspect of the invention the receiver is further arranged to receive the data signal and the Paging Indicator Signal in a time-multiplexed fashion, wherein the data signal and the paging Indicator Signal are time-multiplexed onto a single channel. Such channel can be a logical or a physical channel. The paging information and the data signal are still separated services from the point of view of the receiver, however they are carried over a single channel. In typical prior art systems, once a state transition has occurred, the MAC (layer 2) layer may indicate to a physical layer (layer 1) of the device that a new transport channel is to be received, possibly on a different physical channel, which demands a switch between channels and results in further delay. According to the invention the benefit of the approach chosen is that it allows the receiver, or actually any device comprising such receiver to listen to e.g. a subsequent Broadcast data transmission immediately after having received a Paging Indicator Signal, without having to switch state or channel, hence reducing signaling overhead and channel set-up delays thereby further reducing the latency of the system. A further advantage is that by using a single combined channel, instead of two independent channels, the number of channels itself can be reduced, which is helpful in freeing up scarce resources of the wireless link between the transmitter and the receiver. In addition, a reduction of the number of channels both logical and physical, results in a simpler mapping of high layer (e.g. MAC) application and physical layer parameters.

An example of a state transition according to the invention is provided below. Assumed is that the receiver is in dormant state (Idle Mode) and that there is a combined channel (PFACH=Paging & Forward Access Channel) for sending the Paging Indicator Signal and broadcast data. Both the Paging Indicator Signal and the Broadcast data services are transmitted on the PFACH channel under a time-multiplexing scheme. The receiver is connected to the network is in dormant state, i.e. the receiver is occasionally listening for paging information on the PFACH channel, and the terminal is discontinuously receiving for power saving purposes. A transmitter may transmit a specific Paging Indicator Signal to the terminal to inform the receiver that it is to receive some Broadcast data in an upcoming transmission scheduled on the PFACH. Upon reception of the Paging Indicator Signal the receiver informs its internal physical layers of the upcoming changes in the transport format and that reception should be switched to continuous mode. The receiver may then switch to a more active state from the point of view of its internal layers, while keeping the same connected state to the network. Having performed the necessary changes for reception of the Broadcast information on the PFACH, the user terminal receives the Broadcast service. The actual state transition between Paging in Idle Mode and reception of Broadcast data in CELL_FACH no longer needs to occur as such in terms of signaling, as it is superseded by a virtual switch that occurs within the user terminal and that is transparent to the network. Paging and Broadcast data are sent on the same channel and are differentiated by the use of discontinuous reception where the user terminal listens to a simple signal at regular intervals (Paging) and only wakes-up to listen continuously to a data service (Broadcast) if it receives a Paging Indicator Signal.

According to another aspect of the invention the transmitter is arranged to time-multiplex the transmission of the Paging Indicator Signals to at least one of the at least one receivers wherein a time periodicity in the time-multiplexing of the Paging Indicator Signals is a configurable time periodicity. As Paging Indicator Signals are time-multiplexed to the different receivers whereas data signals such as broadcast data is sent to all user terminals all the time, there may be a need to indicate different offsets for different receivers. It is possible under this scheme to introduce a configurable periodicity in the time-multiplexing of paging indicators, where the identification to a receiver of an upcoming broadcast transmission is performed within a given time range.

The FIGURE illustrates a flow chart of a method of operation of the receiver according to an aspect of the invention described hereinabove. The method includes the step of providing a receiver arranged to operate in one of a plurality of access modes that are used to initiate network access (Step 100). The receiver then receives a Paging Indicator Signal (Step 102), The Paging Indicator Signal instructs the receiver to perform a direct transition from a current access mode to another access mode among the plurality of access modes by the Paging Indicator Signal (Step 104), The Paging Indicator Signal includes an indication of the one of the plurality of access modes to which the transition is to be performed.

Overall the invention offers the advantage for faster set-up, particularly when the configuration of states and/or parameters has to be changed frequently. A unified fast signaling mechanism is provided for mobile terminals, providing fast set-up by means of indicators to pre-configured configurations, for both network-initiated and terminal initiated calls.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims.

The invention claimed is:

1. A receiver for receiving wireless communication signals from a transmitter, wherein the receiver is arranged to operate in one of a plurality of access modes that are used to initiate network access, wherein the receiver upon reception of a Paging Indicator Signal is instructed to perform a direct transition from a current access mode to another access mode among the plurality of access modes by the Paging Indicator Signal, the Paging Indicator Signal including an indication of the one of the plurality of access modes to which the transition is to be performed.

2. The receiver according to claim 1, wherein the indication includes a reference to a set of access parameters, which characterizes the access mode to which the transition is to be performed.

3. The receiver according to claim 2, wherein the receiver is arranged to select the set of access parameters from a larger set of access parameters in response to receipt of the Paging Indicator Signal.

4. The receiver according to claim 1, wherein the receiver is arranged to ignore the indication included the Paging Indicator Signal in dependence of the access mode the receiver is currently operating in.

5. The receiver according to claim 1, wherein the receiver is arranged to operate in one of a plurality of states upon reception of the Paging Indicator Signal and is arranged to perform a state transition from a current state to another state among a plurality of states, the indication included in the Paging Indicator Signal being indicative of the one of the plurality of states to which the state transition is to be performed.

6. The receiver according to claim 5, wherein the receiver upon receipt of the Paging Indicator Signal, either performs a transition from a current access mode to another access mode among the plurality of access modes or a state transition from the current state to another state among the plurality of states.

7. The receiver according to claim 5, wherein the indication of one of the plurality of states includes a reference to a pre-configured set of characteristics for the state to which the transition is to be performed.

8. The receiver according to claim 5, wherein the state transition is performed immediately upon reception of the Paging Indicator Signal.

9. The receiver according to claim 5, wherein the receiver is arranged to receive a data signal after the state transition.

10. The receiver according to claim 9, wherein the receiver is arranged to receive the data signal and the Paging Indicator Signal in a time-multiplexed fashion, wherein the data signal and the Paging Indicator Signal are time-multiplexed onto a single channel.

11. A transmitter for transmitting wireless communication signals to at least one receiver, the at least one receiver being arranged to operate in a plurality access modes wherein, the transmitter is arranged to transmit a Paging Indicator Signal to at least one of the at least one receiver, the Paging Indicator Signal (i) including an indication of the one of the plurality of access modes to which the direct transition is to be performed by the at least one receiver and (ii) instructing the at least one receiver to perform the direct transition.

12. The transmitter according to claim 11, wherein the at least one receiver is arranged to operate in a plurality of states, the Paging Indicator Signal further including an indication of the one of the plurality of states to which a state transition is to be performed by at least one of the at least one receiver.

13. The transmitter according to claim 11, wherein the indication included in the Paging Indicator Signal includes a reference to a pre-configured set of characteristics for the access mode.

14. The transmitter according to claim 13, wherein the pre-configured set further includes characteristics for the state-transition which is to be performed by the receiver and which is referenced by the indication included in the Paging Indicator Signal.

15. The transmitter according to claim 11, wherein the transmitter is arranged to time-multiplex the transmission of the Paging Indicator Signals to at least one of the at least one receivers, and wherein a time periodicity in the time-multiplexing of the Paging Indicator Signals is a configurable time periodicity.

16. The transmitter according to claim 11, wherein the transmitter is arranged to time multiplex the transmission of the Paging Indicator Signal and the transmission of a data signal to at least one of the at least one receivers onto a single channel.

17. A mobile terminal comprising a receiver according to claim 1.

18. A base station comprising at transmitter according to claim 11.

* * * * *